Oct. 27, 1964 P. R. SMITH ETAL 3,153,857

OPTICAL ALTITUDE COMPUTING DEVICE

Filed Aug. 4, 1961

INVENTORS,
Paul R. Smith
BY Joseph W. Mather

S. J. Rotondi, A. J. Dupont & F. D. Goode

United States Patent Office 3,153,857
Patented Oct. 27, 1964

3,153,857
OPTICAL ALTITUDE COMPUTING DEVICE

Paul R. Smith, Quarters 116, Aberdeen Proving Ground, Md., and Joseph W. Mather, P.O. Box 143, Aberdeen, Md.

Filed Aug. 4, 1961, Ser. No. 129,484
1 Claim. (Cl. 33—64)
(Granted under Title 35, U.S. Code (1952), sec. 266)

Figures 1, 2:
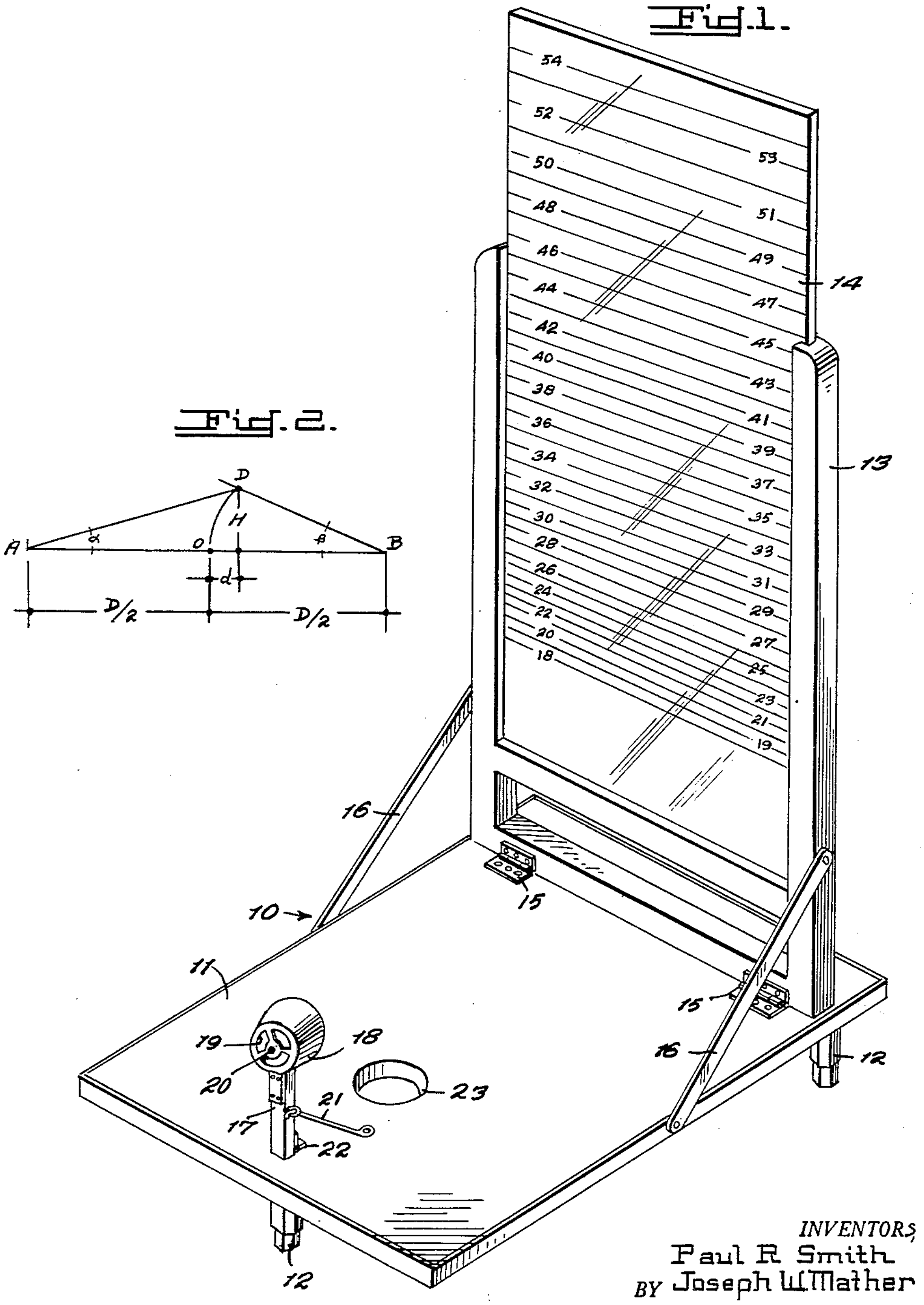

The invention described herein may be manufactured and used by or for the Government for governmental purposes without the payment to us of any royalty thereon.

This invention relates to an improved means for measuring the maximum altitude attained by a visually observed missile, and more particularly it relates to a compact, portable device for determining the maximum altitude attained by ground launched pyrotechnic signals.

It is well known in the art of ammunition surveillance that functional tests, are performed at regular, periodic intervals on random selections from the various manufactured lots of ordnance explosive materiel in an effort to detect premature deterioration in its earliest stages and thus promote safety and combat readiness. One such test consists of measuring the maximum altitude obtainable from randomly selected pyrotechnic items from each manufactured lot undergoing inspection.

A loss of altitude in any given lot, as compared to the altitude attained when the lot was initially manufactured, evidences some degree of deterioration of the propelling explosive. Such information reflects the rate of propellant deterioration and accordingly facilitates the proper selection of which ammunition lots are to be expended first, and which lots are to be destroyed or stored, with special attention to the increased fire hazard due to premature deterioration.

Accordingly, it is an object of this invention to provide a light weight, portable device for measuring the maximum altitude of pyrotechnic ammunition items.

Another object is to render such altitude measurements highly accurate by utilizing two such devices in conjunction with each other while located a given distance apart.

Other objects and features of the invention will become apparent to those skilled in the art as the disclosure is made in the following description of a preferred embodiment of the invention as illustrated in the accompanying drawing wherein:

FIGURE 1 illustrates an isometric projection of a single optical altitude computer; and FIGURE 2 illustrates a schematic representation of the manner in which two altitude computing devices are used in relation to the pyrotechnic launching site.

Referring now in greater particularity to the drawing, there is shown in FIGURE 1 a collapsible optical computing device 10 comprised of a base 11 supported by three adjustable legs 12. The use of three adjustable legs provides for stability and ease of leveling. Near one end of base 11 is a perpendicularly upstanding U-shaped frame 13 carrying a window 14 of Plexiglas or other suitable material rigidly connected thereto. Hinges 15 connect frame 13 to base 11 and provide for collapsibility therebetween. Latching arms 16 provide for rigid support of frame 13 in its upstanding position.

Near the other end of base 11 is a callapsible viewing volumn 17 having an eyepiece 18 mounted on the top thereof. The eyepiece, formed of plastic or other suitable material, has a plurality of equally spaced apertures 19 near its periphery and a small circular aperture 20 located at its center. The viewing column 17, adapted for pivotal raising and lowering about hinge 22, is retained in its upright position by stabilizing hook 21.

Base 11 contains a recess 23 which accommodates eyepiece 18 in its lowered or collapsed position.

Window 14 has engraved thereon a plurality of parallel, horizontally spaced lines. Each of these lines is numbered so as to correspond to the angle formed between an imaginary horizontal plane through aperture 20 and line of sight through aperture 20 and a particular engraved line on window 14. Thus, as shown in FIGURE 1, the lines engraved on window 14 are numbered from 18 to 54 thereby indicating, for example, that when viewed through aperture 20, any objective coincident with the line of sight passing through line numbered 40 would indicate that objective to be at an elevation of 40° above an imaginary horizontal plane passing through aperture 20.

Referring now to FIGURE 2, "O" represents the launching site of the pyrotechnic ammunition device to be tested. "A" and "B" represent the locations of two optical altitude computers constructed according to the present invention. The flight of the pyrotechnic device follows trajectory "OD," and the maximum altitude attained is simultaneously observed by both computing devices through apertures 20 and windows 14 and recorded. The angles "$\alpha$" and "$\beta$" are measured from each computing device location by the operators first observing the bath of the missile through large apertures 19 and then noting through aperture 20 the highest engraved line 18 to 54 on window 14 attained by the airborne device. It is of course understood that the trajectory of the pyrotechnic device should lie substantially in the same vertical plane as that of the two computers.

The tangents for each of the angles "$\alpha$" and "$\beta$" can easily be expressed as follows:

$$\left(\frac{D}{2}+d\right)(\tan \alpha)=H \quad (1)$$

$$\left(\frac{D}{2}-d\right)(\tan \beta)=H \quad (2)$$

Solving Equation 2 for "$d$" and substituting in Equation 1 yields:

$$H=D\,\frac{\tan \alpha \tan \beta}{\tan \alpha+\tan \beta} \quad (3)$$

Equation 3 can be further simplified to yield:

$$H=\frac{D}{\cot \alpha+\cot \beta} \quad (4)$$

Knowing the values of "$\alpha$" and "$\beta$," as determined from the computing devices hereinabove described, the values of the respective cotangents can be easily determined from a table of trigonometric functions. The distance "D" being known, it becomes a relatively simple matter to substitute these quantities into Equation 4, above, and thereby determine "H."

Thus, it can now be easily seen that this invention provides a simple and effective apparatus for determining the maximum altitude of a visually observed pyrotechnic projectile.

Numerous tests have indicated that novice operators of this computer device can easily read the maximum trajectory within 1° on the window scale provided. Accordingly, based on a 1° human accuracy deviation, this invention is accurate to within 2.03%.

Various modifications are contemplated and may obviously be resorted to by those skilled in the art without departing from the spirit of the invention or the scope of the appended claim, as only a preferred embodiment has been disclosed.

What is claimed and desired to be secured by Letters Patent of the United States is:

An optical elevation computer system comprising a pair of mutually facing computing devices spaced apart a predetermined distance and trained toward a common object, each computing device comprising a planular base having adjustable support members connected to the underside of said base to maintain the base in a level horizontal position, a U-shaped support frame having a recessed track within its inner periphery, rigid support hinges attached at one end to said planular base and connected at the other end to the support frame to permit said frame to fold upon said base when not in use, a removable transparent scale member slidable within the track of the support frame, said transparent scale member being properly graduated by horizontal lines engraved thereon, a collapsible viewing column attached to said planular base, an apertured eyepiece positioned on top of said column for viewing said object through the transparent scale, a recess within said base to receive the eyepiece when said column is in a folded position and the distance between said lines on the graduated transparent scale representing one degree difference in elevation when viewed through the apertured eyepiece whereby the angle of elevation from each eyepiece may be read on the respective transparent scales of each computing device and from which the altitude of the object may be calculated by any desired method.

References Cited in the file of this patent

UNITED STATES PATENTS

| | | |
|---|---|---|
| 510,339 | Henderson | Dec. 5, 1893 |
| 736,557 | Shoemaker | Aug. 18, 1903 |
| 991,598 | Barbow | May 9, 1911 |
| 2,474,466 | Carling | June 28, 1949 |
| 2,519,727 | Yezdan | Aug. 22, 1950 |

FOREIGN PATENTS

| | | |
|---|---|---|
| 87,512 | Germany | July 16, 1896 |
| 607,532 | France | July 3, 1926 |